United States Patent
Novinsky et al.

(10) Patent No.: US 6,670,729 B2
(45) Date of Patent: Dec. 30, 2003

(54) INTELLIGENT CIRCUIT BREAKER MODULE

(75) Inventors: Sam Novinsky, San Jose, CA (US); David Skirmont, Redwood City, CA (US)

(73) Assignee: Pluris, Inc., Cupertino, CA (US)

( * ) Notice: Subject to any disclaimer, the term of this patent is extended or adjusted under 35 U.S.C. 154(b) by 232 days.

(21) Appl. No.: 09/849,055

(22) Filed: May 3, 2001

(65) Prior Publication Data

US 2002/0163254 A1 Nov. 7, 2002

(51) Int. Cl.[7] ................................................ H02H 1/04
(52) U.S. Cl. ........................ 307/328; 361/654; 361/732; 200/43.01
(58) Field of Search .................. 307/328, 38; 361/609, 361/615, 673, 732, 654; 200/43.14, 43.15, 43.16, 43.21, 50.01, 50.02, 50.17, 50.19

(56) References Cited

U.S. PATENT DOCUMENTS

| | | | | |
|---|---|---|---|---|
| 4,885,436 A | * | 12/1989 | Pham et al. | ............. 200/43.16 |
| 4,931,907 A | * | 6/1990 | Robinson et al. | ........... 361/673 |
| 5,113,043 A | * | 5/1992 | Morris | .................... 200/43.14 |
| 6,127,742 A | * | 10/2000 | Weynachter | ................. 307/38 |
| 6,137,068 A | * | 10/2000 | Padulo | ..................... 200/50.02 |

* cited by examiner

Primary Examiner—Ronald W. Leja
(74) Attorney, Agent, or Firm—Donald R. Boys; Central Coast Patent Agency, Inc.

(57) ABSTRACT

A replaceable circuit breaker module has a housing for supporting and enclosing elements of the module, a circuit breaker mounted in the housing in a manner that an action of installing the module connects the breaker to bridge an incoming and an outgoing conductor, and monitoring circuitry for monitoring characteristics of the circuit breaker, the monitoring circuitry mounted in the housing and having a first connector element for engaging a mating connector element in the action of installing the module. The module is characterized in that action of withdrawing the circuit breaker module also withdraws the monitoring circuitry. Sensors in the monitoring circuitry may include sensors for monitoring one or more of breaker presence, on/off state of the breaker, and voltage provided to the breaker.

10 Claims, 3 Drawing Sheets

INTELLIGENT CIRCUIT BREAKER MODULE

FIELD OF THE INVENTION

The present invention is in the area of electric power distribution, and has particular application to power distribution for rack-mounted electronic systems.

BACKGROUND OF THE INVENTION

Power distribution systems in current art exist for routing and/or converting AC or DC power to devices or systems in a wide variety of situations, and have been the subject of considerable research and development. A variety of power distribution systems have been developed to power systems and devices in many different applications that vary greatly in voltage, wattage, design and sophistication, depending on the power requirements and other specific requirements of the application. For example, in some applications the systems or devices powered by the distribution system are allowed to completely power down during repair or upgrade of the power distribution system itself, or any component of the system, while other applications may require that the powered systems or devices remain at least partially powered on and functioning during such events.

In critical applications such as systems for routing or switching data packets on the Internet, the computer equipment and devices require constant and consistent power to be supplied at all times to allow for continuous and extended operation under all power conditions, maintaining a high degree of operating reliability for data or process security.

Uninterruptible and redundant power distribution systems have been incorporated to achieve this "always-on" feature. Such systems, through such as parallel connection and operation, allow for repair or replacement of some part of the power system without disrupting the power distributed. It is in this critical environment that embodiments of the present invention are used.

Such power distribution systems are used with Internet routing equipment of various size and capacity, ranging from small desktop pedestal units, to mid and upper-range routing systems. Components of the power distribution system are sometimes contained within the chassis of the router, often accessible from the back of the chassis, as in the case of a pedestal unit. However, with current and probable future growth of network traffic over the Internet, it is desirable for many Internet routing equipment users to be capable of long-term traffic-handling capacity growth and extremely high availability of the routing equipment, expandable (scalable) in accordance with demand.

In order for Internet routing service providers to respond to growing traffic-handling needs and to achieve gigabit and terabit-per-second data-handling performance, multi-chassis, scalable router designs are being incorporated, allowing installation of additional modular components. The scalable chassis, commonly referred to as a rack chassis in the art, also incorporates a scalable circuit breaker and power distribution system in order to adequately serve the additional power requirements of added (scaled-up) circuitry. A scalable circuit breaker system typically comprises a plurality of removable breaker boxes modularly mounted in separate slots or assemblies within the rack chassis, which is often the same chassis containing the modular units comprising the cards and other components of the router. The combination of breaker boxes has the primary function of protecting the router components in the case of a power surge or overload, and during such an event, continues to distribute uninterrupted power to conductors distributing power elsewhere in the router.

In such a system separate breaker modules are connected in parallel to points on the incoming and outgoing power carrier so that one of a pair of breaker modules in a live power distribution system can be removed for repair or upgrade, for example, while the remaining connected module continues to supply constant and interrupted power to the components of the router. Hot-swapping, as it is known in the art, is a frequently practiced method of module removal and insertion in many different systems were constant power delivery is critical.

The components of a large, scalable Internet router as described herein typically operate at DC voltage that is commonly supplied to the breaker modules of the scalable router by a battery room which converts the primary power of the host facility to DC power. The converted DC power is supplied to the breaker modules at low voltage and high amperage level depending on the power requirements. The rack-mounted breaker modules utilize standard breaker switches for circuit protection, and additional safeguards are often incorporated in such power systems to maintain reliability and availability of the power, as well as to minimize electrical hazards.

In an extremely critical environment such as for Internet data routing as described above, system up time must be maximized, and any malfunction or anomaly within the routing equipment or power distribution system must be quickly identified and rectified. For a technician or worker remotely monitoring the operation of the circuit breaker system for large scalable Internet router, for example, it is particularly important for all of the monitored data of circuit breaker operating status to be complete and accurate. One problem inherent with large and complex systems with remote monitoring or control capability such as described above, is that, should a failure or malfunction occur in the monitoring card or any of the connections between it and the circuit breakers, the reliability of the data send for monitoring is compromised, and a false indication may be given. Additionally, determination of the cause of a problem indicated by the monitor, such as low voltage in a circuit breaker, for example, may not actually be true, but instead a malfunction within the monitoring card causing a false reading. In such a circuit breaker monitoring system with centralized intelligence on a monitoring card, such as is common in current art, it can be difficult for a worker or technician to accurately determine if the reported problem is real and has a real cause, or is misrepresented by a faulty monitoring card. Such a monitoring system decreases in reliability and dependability as the size and complexity of the system increases. As the number of line and fabric card modules, for example, installed in the rack chassis increases, the number of circuit breaker modules and related connections to the monitoring card also increases, having a further detrimental effect on the reliability of the data sent by the monitoring card.

What is clearly needed, is an improved method and apparatus for protecting circuits in a scalable modular chassis that provides reliable intelligence for remote monitoring of basic status and functions of the circuit breaker system, while supplying highly reliable, redundant power output for distribution to other parts of the host system.

SUMMARY OF THE INVENTION

In a preferred embodiment of the present invention a replaceable circuit breaker module is provided, comprising a housing for supporting and enclosing elements of the module, a circuit breaker mounted in the housing in a manner that an action of installing the module connects the breaker to bridge an incoming and an outgoing conductor, and monitoring circuitry for monitoring characteristics of the circuit breaker, the monitoring circuitry mounted in the housing and having a first connector element for engaging a mating connector element in the action of installing the module. The module is characterized in that action of withdrawing the circuit breaker module also withdraws the monitoring circuitry.

In preferred embodiments the monitoring circuitry includes sensors for monitoring one or more of breaker presence, on/off state of the breaker, and voltage provided to the breaker. Also in some embodiments the module is configured as a docking module for docking in a bay of a cabinet to be powered, and the installation action is an action of docking the module in the docking bay.

In some embodiments there is a safety mechanism for preventing the module from being docked or withdrawn with the breaker on. The safety mechanism may comprise a horizontal bar guided vertically in slots such that the bar is held in a notch of a bracket affixed to a cabinet to be powered when the breaker is closed (on), and lowering the bar from the notch to release the module for extraction trips the breaker open (off), thus preventing arcing during docking or withdrawing of the module.

In another aspect of the invention an electronic cabinet having a redundant power supply is provided, comprising a redundant power unit having docking bays for two or more breaker modules, a first conductor delivering power to the power unit from an external source, and a second conductor delivering power from the power unit to elements in the cabinet from the power unit. Each breaker module comprises a housing for supporting and enclosing elements of the module, a circuit breaker mounted in the housing in a manner that an action of installing the module connects the breaker to bridge first and the second conductors, and monitoring circuitry for monitoring characteristics of the circuit breaker, the monitoring circuitry mounted in the housing and having a first connector element for engaging a mating connector element in the action of installing the module, such that action of withdrawing the circuit breaker module also withdraws the monitoring circuitry.

In some embodiments of the cabinet the monitoring circuitry includes sensors for monitoring one or more of breaker presence, on/off state of the breaker, and voltage provided to the breaker. Also in some embodiments the module is configured as a docking module for docking in a bay of a cabinet to be powered, and the installation action is an action of docking the module in the docking bay.

In some embodiments the cabinet further comprises a safety mechanism preventing the module from being docked or withdrawn with the breaker on. The safety mechanism may be a horizontal bar guided vertically in slots such that the bar is held in a notch of a bracket affixed to a cabinet to be powered when the breaker is closed (on), and lowering the bar from the notch to release the module for extraction trips the breaker open (off), thus preventing arcing during docking or withdrawing of the module. The cabinet may be dedicated to a packet router in the Internet.

In yet another aspect of the invention a method for improving reliability of a redundant breaker system for an electronic cabinet is provided, comprising the steps of (a) providing two or more breaker modules configured, when installed, to bridge the same two power buses; and (b) providing breaker monitoring circuitry with each of the two or more breaker modules, the monitoring circuitry configured to be removed and replaced with the breaker modules, such that monitoring circuitry is replaced whenever a breaker module is replaced.

In some embodiments of the method the monitoring circuitry includes sensors for monitoring one or more of breaker presence, on/off state of the breaker, and voltage provided to the breaker. Also in some embodiments the modules are configured as docking modules for docking in bays of the cabinet to be powered, and the installation action is an action of docking the module in the docking bay. In some cases the modules further comprise a safety mechanism preventing the modules from being docked or withdrawn with the breaker on. The safety mechanism may be a horizontal bar guided vertically in slots such that the bar is held in a notch of a bracket affixed to a cabinet to be powered when the breaker is closed (on), and lowering the bar from the notch to release the module for extraction trips the breaker open (off), thus preventing arcing during docking or withdrawing of the module.

In various embodiments of the present invention taught in enabling detail below, for the first time a breaker module is provided having built-in monitoring circuitry, such that the monitoring circuitry gets replaced whenever a module is replaced.

BRIEF DESCRIPTION OF THE DRAWING FIGURES

FIG. 3b is a rear perspective view of the circuit breaker module of FIG. 3a.

DESCRIPTION OF THE PREFERRED EMBODIMENTS

Internet routing service providers wishing to achieve the highest traffic-handling capability possible with current technology and methods, must possess and maintain computer equipment for data routing and switching that is capable of handling an ever-increasing amount of data traffic, while keeping routing system operating downtime to an absolute minimum, even during upgrades or repairs. An operator of such equipment must be capable of quickly and easily increasing data-handling and power distribution capacity to the system as needed, and must also be constantly informed of the status of the system while in operation, particularly the power distribution and circuit breaker system. Failures or malfunctions occurring in any part of the power distribution or circuit breaker systems, or incorrect status data sent by a malfunctioning circuit breaker sensing system make on his a monitoring worker or technician to misdiagnose a problem, for example, and may result in damaged hardware and a pronounced detrimental effect on the up-time availability of the Internet data routing system.

Figure 1:
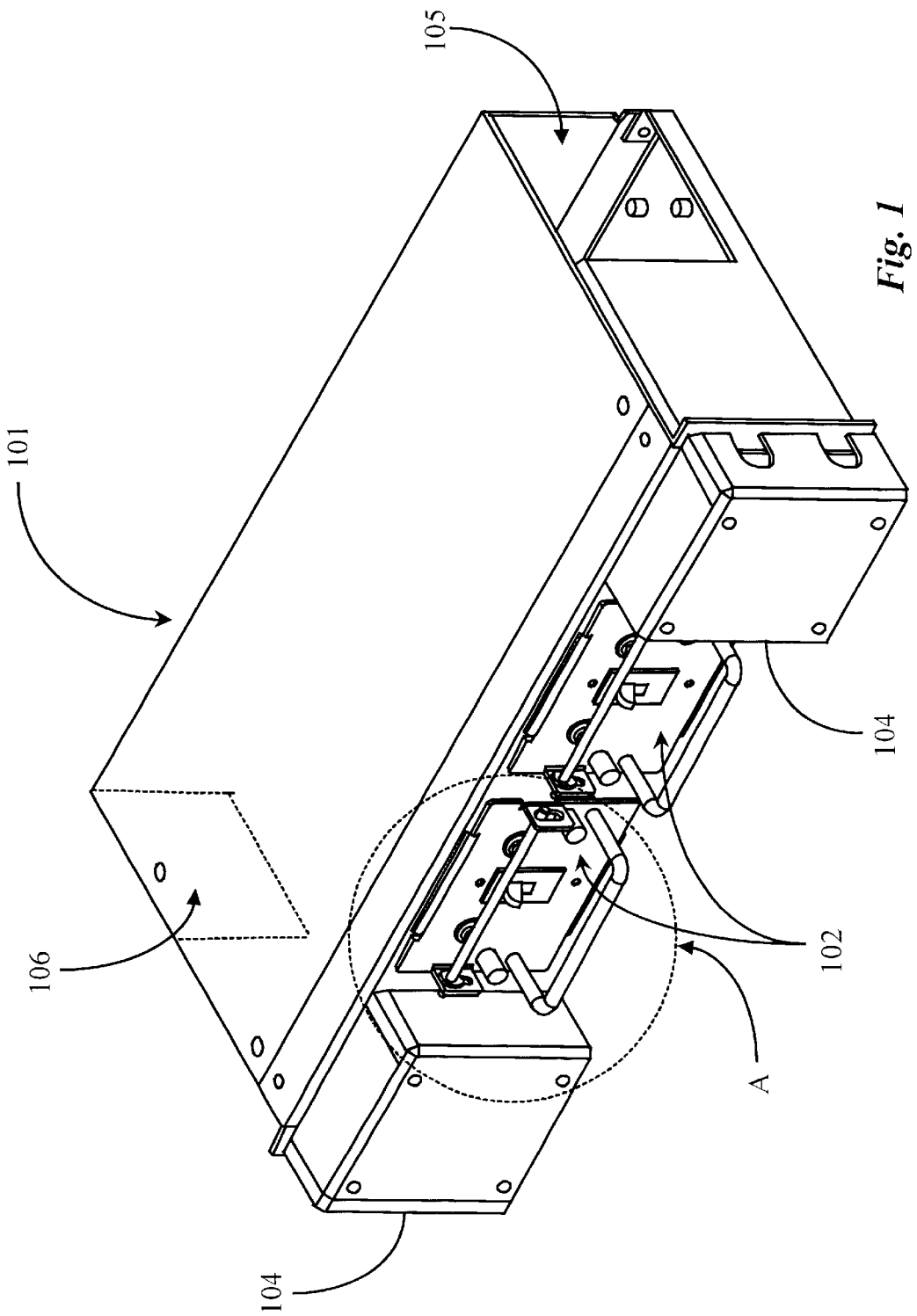
FIG. 1 is a perspective view of a circuit breaker assembly containing circuit breaker modules according to an embodiment of the present invention.

FIG. 1 is a perspective view of a circuit breaker assembly 101 containing circuit breaker modules according to an embodiment of the present invention. Assembly 101 functions as the power distribution assembly for a rack system where it is used, and is similar to a standard rack-mountable assembly designed for use with common rack chassis configurations, such as those used for Internet routing equipment, as is the case in this example. Assembly 101 in this embodiment is of rectangular box-like shape and is manufactured of sheet metal or other similar material commonly used in the art, and has, in this example, a total of two rectangular openings, hidden in this view for reasons of simplicity, on the front face, to accommodate insertion and mounting of one or more slide-in circuit breaker modules 102.

Circuit breaker modules 102 are designed to fit and slide into separate internal bays provided at each of the front openings. A total of two openings and bays exist in the embodiment presented, however in other embodiments a varying number of openings and bays may exist providing accommodations for an equal number of circuit breaker modules. At each end of assembly 101, facing to the outside, there are entrance interfaces for power cables bringing power to the assembly. In this example each of these entrances comprises a structure 104 with openings shown for entrance of power cables. Assembly 101 has a rectangular-shaped opening 105 located on one side towards the rear of the assembly, allowing passage of one or more power cables for supplying DC power from this breaker assembly to power-using elements in a cabinet (not shown) served by the breaker assembly described herein.

The incoming cables carry the power supplied by a battery room, which converts the primary power of the facility to an intermediate DC voltage at a relatively high amperage capability. The supplied power typically is safeguarded from disruption or failure by a battery backup system in the battery room. Outgoing cables via opening 105 carry power to the power-using elements protected by the breaker assembly.

The breaker system described herein connects the incoming and the outgoing power cables to provide power to chassis components from the power room in a manner designed to maximize uptime and circuitry protection.

Circuit breaker modules 102 are modular units that can be inserted into, and removed from the earlier described bays within assembly 101. The connection described between the previously described incoming and outgoing power cables within assembly 101 is served by both circuit breaker modules 201 in tandem, providing a redundant power supply, and an ability to hot-swap the modules in case of need for repair or upgrade. New and novel functionality has been incorporated into circuit breaker modules 102, which is shown in additional drawings and described below in greater detail.

Figure 2:
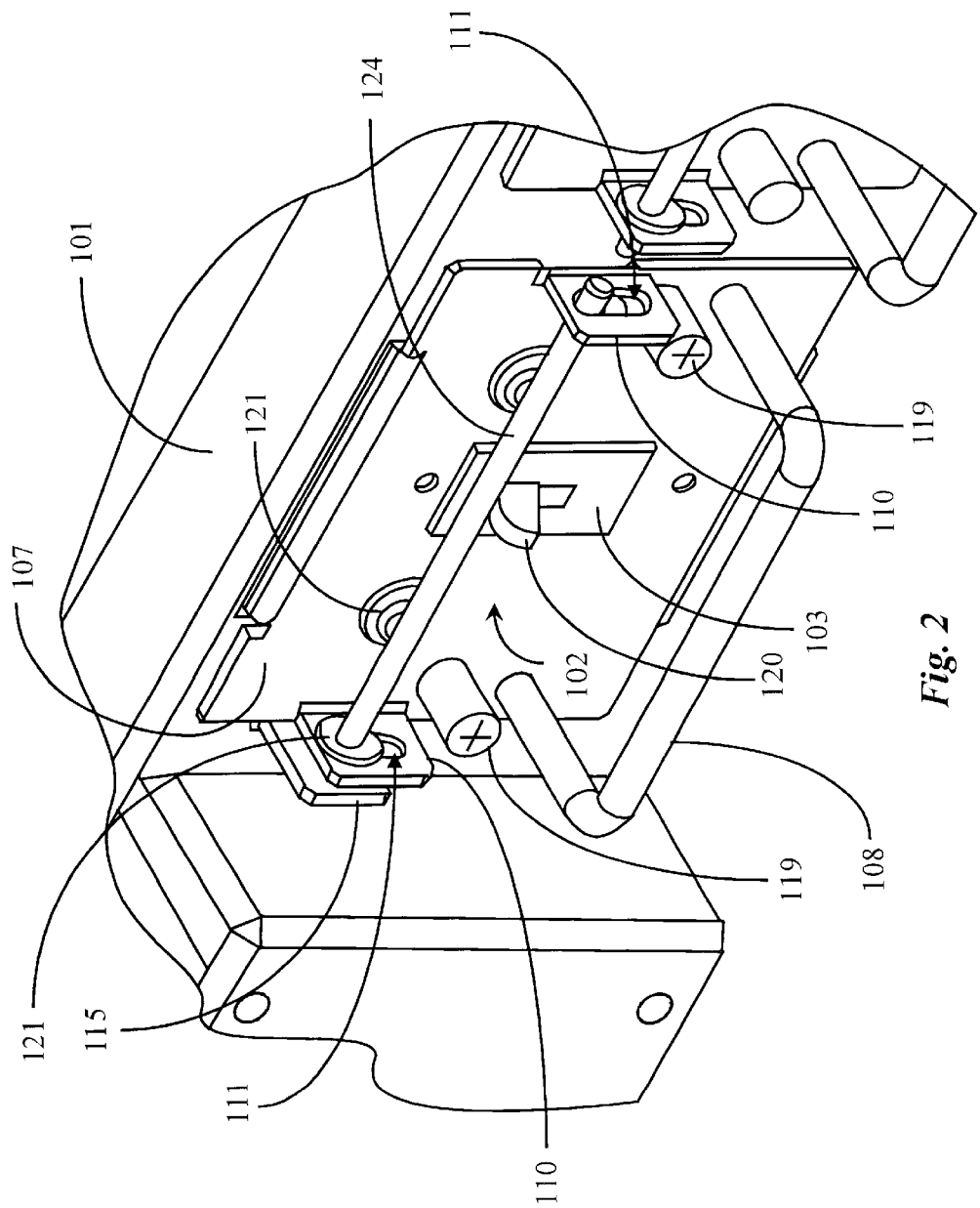
FIG. 2 is a perspective view of detail A of FIG. 1, enlarged to show greater detail.

FIG. 2 is a perspective view of region A of FIG. 1, enlarged to show greater detail. Elements of one of the circuit breaker modules 102, and a portion of assembly 101 are seen more clearly in this view. Circuit breaker module 102 has a circuit breaker 103 mounted on front face 107 of circuit breaker module 102. Circuit breaker 103 is a standard circuit breaker, having a toggle 120 extending outward from front face 107, used for turning circuit breaker 103 on or off. As is standard, circuit breaker 103 is configured for operation with voltage at certain amperage, so that if an electrical short or power overload occurs circuit breaker 103 turns itself off, and toggle 120 goes automatically to the off position.

Circuit breaker 103 is shown in this view in the on position, with toggle 120 in the upward position. A locking bar 124, of a length slightly longer than the width of front face 107, is provided to prevent extraction of a circuit breaker module while the breaker is on. Bar 124 is retained in the upward position by a pair of spring-loaded detents 122. The detents are provided because the toggle is sensitive, and could be tripped by the weight of the locking bar if the bar were to rest on the toggle. Locking bar 124 at its outboard ends is restrained by a pair of end brackets 110 which are located at either end of and attached to front face 107. Each end bracket 110 has a vertical elongated slot 111, extending completely through and having a width slightly larger than the diameter of locking bar 124. The height and width of slots 111 are such that the opposite ends of locking bar 124 are allowed to extend through end brackets 110 and protrude slightly beyond their outer edges, allowing locking bar 124 to travel vertically in both directions within slots 111, while minimizing forward and backward horizontal movement. In this way locking bar 124 can assume an upper or lower position. Locking bar 124 has a pair of stop washers 121 in this example, secured to locking bar 124 semi-rigidly near the opposite ends near end brackets 110. The purpose of stop washers 121 is to prevent side-to-side movement of locking bar 124, thereby preventing it from slipping out of slots 111.

A locking bracket 115 can be seen in this view positioned closely to the left end bracket 110, and is permanently attached to the face of assembly 101. Locking bracket 115 is slightly larger and shaped similarly to end brackets 110, and has a notch, obscured from view by the left end bracket 110, located on the lower edge, designed to securely hold the end of locking bar 124 protruding out from end bracket 110, when locking bar 124 is in the upper position (breaker is on). The purpose of locking bar 124, end brackets 110 and locking bracket 115 is to provide a manual locking system that prevents the circuit breaker module from being removed from assembly 101 while current is flowing through the associated breaker.

With circuit breaker module 102 fully inserted into assembly 101, circuit breaker 103 is shown in this view with toggle 120 in the upward position indicating a powered-on condition. When moved to the upward position toggle 120 pushes the locking bar to be held by detents 122 guided by slots 111 of end brackets 110, and in this position the left end of locking bar 124 rests within and is secured by the notch on the lower edge of locking bracket 115. Circuit breaker module 102 is thus prevented from being pulled out of assembly 101 by the notch in locking bracket 115, which is now securing the left end of locking bar 124. As mentioned previously, the purpose of the locking system described, comprising locking bar 124, end brackets 110 and locking bracket 115 is to prevent circuit breaker module 102 from being extracted from assembly 101 while the power is on, providing a safeguard against possible electrical arcing and the hazards and damage that may result.

In order to remove circuit breaker module 102 from assembly 101, circuit breaker 103 must first be turned off by manually pushing down upon locking bar 124 or toggle 120 of circuit breaker 103. Locking bar 124 must assume the lower position guided by slots 111 of end brackets 110. With locking bar 124 in the lower position, and toggle 120 then in its off position, the left protruding end of locking bar 124 is positioned below the notch on the lower edge of locking bracket 115, allowing circuit breaker module 102 to be extracted from assembly 101. Handle 108, attached to front face 107, is used to remove or insert circuit breaker module 102. Two standard fasteners 119 requiring a tool for manipulation, each mounted on, and extending through front face 107, are positioned slightly above the contact points between handle 108 and front face 107. Fasteners 119 screw into threaded holes in assembly 101, rigidly securing a fully inserted circuit breaker module to assembly 101.

The configuration of the locking system described above also prevents circuit breaker module 102 from being inserted into assembly 101 while toggle switch 120 of circuit breaker 103 is in the upper, or on position. Full insertion of circuit breaker module 102 into assembly 101 requires that first, toggle switch 120 be moved to the lower, or off position, moving locking bar 124 to assume its lower position, placing the left protruding end of locking bar 124 below the notch on the bottom edge of locking bracket 115. If an attempt is made to fully insert and seat circuit breaker module 102 into assembly 101, and toggle 120 is in its upper, or on position, the left protruding end of locking bar 124 will make contact with the front edge of locking bracket 115, preventing full insertion.

Figure 3B:
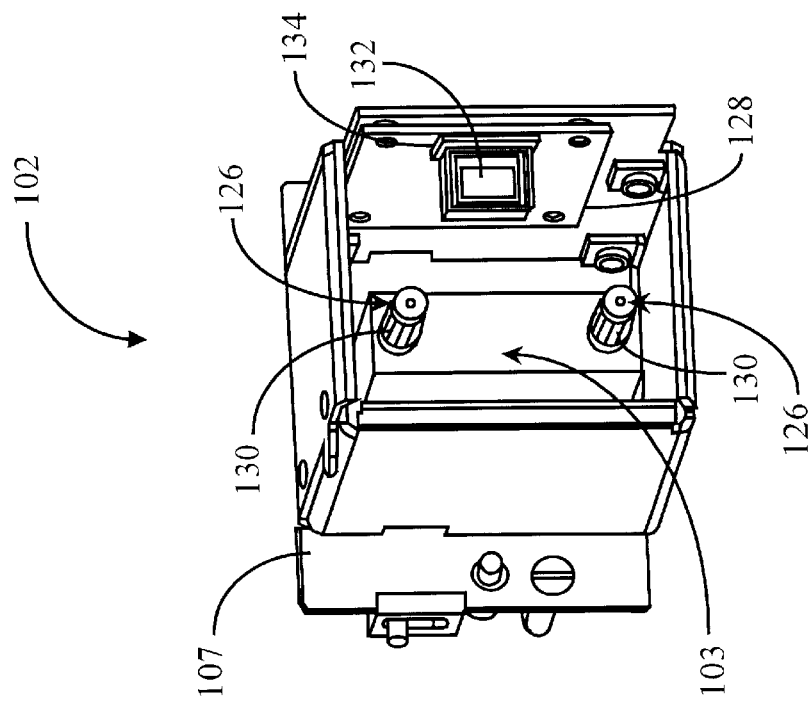
Figure 3A:
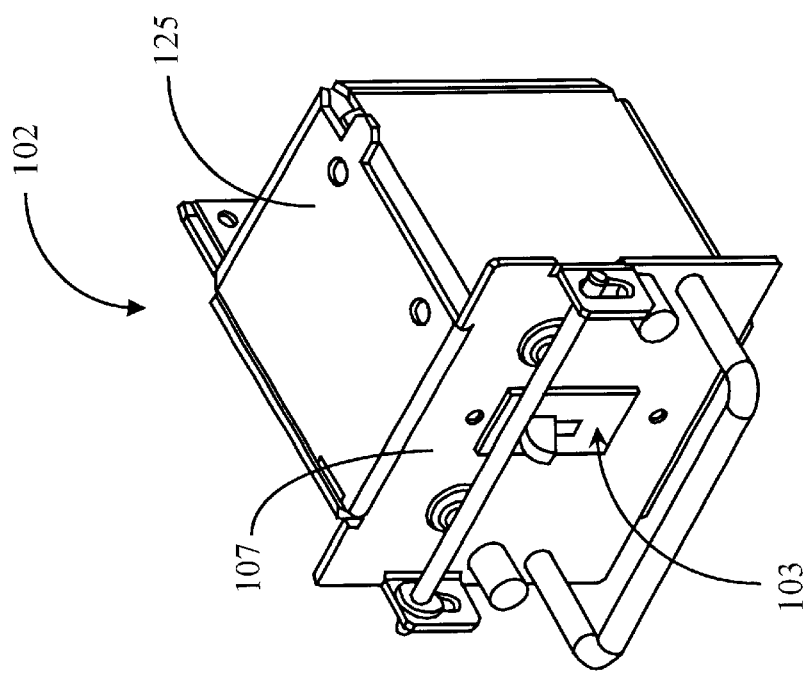
FIG. 3a is a front perspective view of a circuit breaker module of FIG. 1.

FIG. 3a is a front perspective view of circuit breaker module 102 of FIG. 2. In this view circuit breaker module 102 is shown outside of assembly 101. A breaker box 125, forming a body portion of circuit breaker module 102, is the portion inserted into assembly 101 of FIG. 2 and was not shown in FIG. 1 or 2. Breaker box 125 is manufactured of sheet metal or other material similar to that used for assembly 101 of FIG. 2, and is box-like in shape and rigidly constructed to form a sturdy partial enclosure, securely attached to front face 107. Breaker box 125 comprises a top and bottom wall and two side walls, one side wall slightly longer than the other in this example, extending back from front face 107. The backside of breaker box 125 is open to allow for connections to be made between the breaker associated with breaker box 125 and receptacles for posts of the breaker. The receptacles a connected to incoming and outgoing power cables.

FIG. 3b is a rear perspective view of circuit breaker module 102 of FIG. 3a. In this view the inner cavity formed by the body of breaker box 125 is apparent, and circuit breaker 103 is shown attached to the inner side of front face 107. Circuit breaker 103 is of a type standard in the industry, having a pair of posts 126 providing the connection between circuit breaker 103 and the previously mentioned power-in and power-out cables. Each breaker post 126 has a circular, spring-loaded skirt 130, a standard feature for such circuit breakers, that is manufactured of highly conductive material. Skirts 130 are compressed into the body of circuit breaker 103 when the posts are inserted into a receptacle.

A redundant power supply system is achieved by insertion of a second circuit breaker module 102 into assembly 101, the second circuit breaker having a first and second post that each plug into receptacles connected to either of power-in or power-out cables. Connection between the power-in and power-out cables is served by both inserted circuit breaker modules 102, which are each capable of sustaining the load independently, thereby powering the cabinet by two circuit breaker modules 102 between the cables.

A new and novel feature is provided in this embodiment for sensing the operational status and other conditions of circuit breaker 103. A monitor card 128 is provided, in this embodiment as a printed circuit board, with circuitry (in this example) for sensing the presence of a circuit breaker 103 in circuit breaker module 102, whether circuit breaker 103 is turned on or off, and what voltage is being supplied to circuit breaker 103 by the power-in cable. Monitor card 128 is mounted to the inside wall of breaker box 125, and has a multi-pin connector element 132 which plugs into a mating connector (not shown) connected to conductors in the served chassis that lead to a monitoring interface, where the information provided by card 128 may be displayed or used for automatic monitoring purposes.

When circuit breaker module 102 is fully inserted into assembly 101 and circuit breaker posts 126 engage the receptacles connected to the power-in and power-out cables, an electronic connection is simultaneously made between receptacle 132 of monitor card 128, and the mating connector (not shown) mounted within the served cabinet. During operation, monitor card 128 sends the sensed data of the mentioned aspects of circuit breaker 103 to a computer, PC, or other monitoring device so that a worker or technician can monitor all of the functions, or the functions can be monitored automatically.

A key advantage over systems of current art is provided by hosting the intelligence of the monitoring card within the circuit breaker module 102 as taught in this embodiment. In current systems, wherein the monitoring circuitry is located in the served cabinet, much time may have passed since the last replacement of the monitor circuitry, raising the possibility that a malfunction may occur in the monitoring circuitry. If such a malfunction occurs, a worker or technician monitoring the circuit breaker status may see incorrect information provided by the faulty monitoring circuitry, such as incorrect voltage, or the circuit breaker is on or off, for example, which may cause the worker or technician to take unnecessary or incorrect action to rectify the problem. Even more seriously, there may be automatic systems that react to false indications, causing unnecessary interruption of service and downtime. The problem condition indicated by the monitoring card may be due to a failure in the monitoring card, and may not be necessarily a true condition.

In systems utilizing embodiments of the present invention, if monitored data indicates a power-related problem at the circuit breaker, and replacement of the circuit breaker module is the preferred solution to rectify the problem, the circuit breaker module and monitor card are replaced at the same time as one unit. In this way it does not matter so much if the data indicating the problem is a true condition, or the condition was falsely reported by a failure in the monitoring card, because the entire module along with its intelligence is replaced. When a new intelligent circuit breaker module is installed, a higher level of reliability will exist that the sensed data sent for monitoring is correct, because the new circuit breaker module 102 also has a new, tested monitoring card 128.

It will be apparent to one with skill in the art that in other embodiments of the present invention, power redundancy can be increased by installing additional intelligent circuit breaker modules 102 in assembly 101, and in other alternative embodiments assembly 101 may have a varying number of bays for installing additional circuit breaker modules. It will also be apparent that the present invention may be used in a wide variety of electronic cabinets. In still other alternative embodiments the circuit breaker module intelligence may have the capability of sensing additional functions or status related to power operation, such as amperage, component temperature, and so on, without departing from the scope and spirit of the present invention. For these reasons that the present invention should be afforded the broadest possible scope based on the claims that follow.

What is claimed is:

1. A replaceable circuit breaker module comprising:

a housing for supporting and enclosing elements of the module;

a circuit breaker mounted in the housing in a manner that an action of installing the module connects the breaker to bridge an incoming and an outgoing conductor;

monitoring circuitry for monitoring characteristics of the circuit breaker, the monitoring circuitry mounted in the housing and having a first connector element for engaging a mating connector element in the action of installing the module; and a safety mechanism for preventing the module from being docked or withdrawn with the breaker on;

characterized in that action of withdrawing the circuit breaker module also withdraws the monitoring circuitry, and the safety mechanism comprises a horizontal bar guided vertically in slots such that the bar is held in a notch of a bracket affixed to a cabinet to be powered when the breaker is closed (on), and lowering the bar from the notch to release the module for extraction trips the breaker open (off), thus preventing arcing during docking or withdrawing of the module.

2. The module of claim 1 wherein the monitoring circuitry includes sensors for monitoring one or more of breaker presence, on/off state of the breaker, and voltage provided to the breaker.

3. The module of claim 1 wherein the module is configured as a docking module for docking in a bay of a cabinet to be powered, and the installation action is an action of docking the module in the docking bay.

4. An electronic cabinet having a redundant power supply and comprising:

a redundant power unit having docking bays for two or more breaker modules;

a first conductor delivering power to the power unit from an external source;

a second conductor delivering power from the power unit to elements in the cabinet from the power unit; and a safety mechanism preventing the module from being docked or withdrawn with the breaker on;

wherein each breaker module comprises a housing for supporting and enclosing elements of the module, a circuit breaker mounted in the housing in a manner that an action of installing the module connects the breaker to bridge first and the second conductors, and monitoring circuitry for monitoring characteristics of the circuit breaker, the monitoring circuitry mounted in the housing and having a first connector element for engaging a mating connector element in the action of installing the module, such that action of withdrawing the circuit breaker module also withdraws the monitoring circuitry, and the safety mechanism comprises a horizontal bar guided vertically in slots such that the bar is held in a notch of a bracket affixed to a cabinet to be powered when the breaker is closed (on), and lowering the bar from the notch to release the module for extraction trips the breaker open (off), thus preventing arcing during docking or withdrawing of the module.

5. The cabinet of claim 4 wherein the monitoring circuitry includes sensors for monitoring one or more of breaker presence, on/off state of the breaker, and voltage provided to the breaker.

6. The cabinet of claim 4 wherein the module is configured as a docking module for docking in a bay of a cabinet to be powered, and the installation action is an action of docking the module in the docking bay.

7. The cabinet of claim 4 to a packet router in the Internet.

8. A method for improving reliability of a redundant breaker system for an electronic cabinet, comprising the steps of:

(a) providing two or more breaker modules configured, when installed, to bridge the same two power conductors;

(b) providing breaker monitoring circuitry with each of the two or more breaker modules, the monitoring circuitry configured to be removed and replaced with the breaker modules, such that monitoring circuitry is replaced whenever a breaker module is replaced;

(c) providing a safety mechanism preventing the modules from being docked or withdrawn with the breaker on; and (d) providing a horizontal bar in the safety mechanism guided vertically in slots such that the bar is held in a notch of a bracket affixed to a cabinet to be powered when the breaker is closed (on), and lowering the bar from the notch to release the module for extraction trips the breaker open (off), thus preventing arcing during docking or withdrawing of the module.

9. The method of claim 8 wherein the monitoring circuitry includes sensors for monitoring one or more of breaker presence, on/off state of the breaker, and voltage provided to the breaker.

10. The method of claim 8 wherein the modules are configured as docking modules for docking in bays of the cabinet to be powered, and the installation action is an action of docking the module in the docking bay.

* * * * *